(12) United States Patent
Haltiner, Jr. et al.

(10) Patent No.: US 7,700,215 B2
(45) Date of Patent: Apr. 20, 2010

(54) CLAD CURRENT CARRIER FOR A SOLID OXIDE FUEL CELL STACK

(75) Inventors: Karl J. Haltiner, Jr., Fairport, NY (US); James S. Vordonis, Penfield, NY (US)

(73) Assignee: Delphi Technologies, Inc., Troy, MI (US)

(*) Notice: Subject to any disclaimer, the term of this patent is extended or adjusted under 35 U.S.C. 154(b) by 246 days.

(21) Appl. No.: 11/406,873

(22) Filed: Apr. 19, 2006

(65) Prior Publication Data

US 2007/0248871 A1 Oct. 25, 2007

(51) Int. Cl.
  *H01M 2/08* (2006.01)
(52) U.S. Cl. .......................................... 429/37; 429/36
(58) Field of Classification Search .................. 429/36, 429/37, 123, 158, 159, 160
  See application file for complete search history.

(56) References Cited

U.S. PATENT DOCUMENTS

| 4,484,996 | A | * | 11/1984 | Bongartz et al. | ............. 204/288 |
| 4,537,808 | A | * | 8/1985 | Yamamoto et al. | ........... 428/592 |
| 5,468,557 | A | * | 11/1995 | Nishio et al. | ................. 428/384 |
| 5,670,251 | A | * | 9/1997 | Difrancesco | ................. 428/325 |
| 5,834,117 | A | * | 11/1998 | Onishi | ........................ 428/379 |
| 5,835,359 | A | * | 11/1998 | DiFrancesco | ............... 361/803 |
| 2002/0048700 | A1 | * | 4/2002 | Virkar et al. | ................... 429/34 |
| 2003/0068517 | A1 | * | 4/2003 | Andresakis et al. | ......... 428/607 |
| 2005/0084732 | A1 | | 4/2005 | Breault et al. | |
| 2005/0191517 | A1 | | 9/2005 | Shimizu et al. | |
| 2005/0282048 | A1 | | 12/2005 | Kamo et al. | |
| 2006/0000632 | A1 | * | 1/2006 | Thompson et al. | ........ 174/74 R |
| 2006/0008693 | A1 | | 1/2006 | Kamo et al. | |

OTHER PUBLICATIONS

Hackh's Chemical Dictionary (1972), McGraw Hill, Fourth Edition, p. 632, lines 1-3.*
http://www.technicalmaterials.com/markets/fuel_cells.html.
http://www.emsclad.com/examples/fuel-cell.html.

* cited by examiner

*Primary Examiner*—Bruce F Bell
(74) *Attorney, Agent, or Firm*—Thomas N. Twomey

(57) ABSTRACT

A current carrier for a solid oxide fuel cell system comprising a current-carrying core formed of a high-conductivity metallic material such as copper, brass, bronze, silver, silver-copper alloys, molybdenum, tungsten, or the like, and a protective jacket surrounding the core material. Preferably, the jacket is metallurgically bonded to the core. The jacket is formed of a high temperature alloy such as stainless steel, nickel, or a nickel alloy. The jacket is structurally competent to maintain the form of the electrical carrier at elevated temperatures at which the core material may be structurally incompetent. The current carrier may be sized comparable to conventional copper cables. The carrier is attached to a fuel cell current collector by a clamp assembly having a large surface contact area. Preferably, a contact paste consisting of fine silver particles forms a diffusion bond between the clamp and the carrier jacket, resulting in a low-loss connection.

7 Claims, 2 Drawing Sheets ns in an SOFC system at the expected temperatures of operation.
CLAD CURRENT CARRIER FOR A SOLID OXIDE FUEL CELL STACK This invention was made with United States Government support under Government Contract/Purchase Order No. DE-FC26-02NT41246. The Government has certain rights in this invention.

TECHNICAL FIELD

The present invention relates to solid oxide fuel cells; more particularly, to conductor for carrying electric current in a solid oxide fuel cell stack; and most particularly, to an electric current carrier having a core formed of a highly conductive material and a jacket formed of a highly durable and structurally competent material.

BACKGROUND OF THE INVENTION

Fuel cells for combining hydrogen and oxygen to produce electricity are well known. A known class of fuel cells includes a solid-oxide electrolyte layer through which oxygen anions migrate to combine with hydrogen atoms to produce electricity and water; such fuel cells are referred to in the art as "solid-oxide" fuel cells (SOFCs).

In some applications, for example, as an auxiliary power unit (APU) for an automotive vehicle, an SOFC is preferably fueled by "reformate" gas, which is the effluent from a catalytic hydrocarbon oxidizing reformer. Reformate typically includes amounts of carbon monoxide (CO) as fuel in addition to molecular hydrogen. The reforming operation and the fuel cell operation may be considered as sequential oxidative steps of the liquid hydrocarbon, resulting ultimately in water and carbon dioxide. Both reactions are exothermic, and both are preferably carried out at relatively high temperatures, for example, in the range of 700° C. to 1000° C.

A complete fuel cell stack assembly includes a plurality of fuel cells, and a plurality of components known in the art as interconnects, which electrically connect the individual fuel cells in the stack. Electric current must be collected at both ends of the stack (current to and current from the stack) by components known as current collectors. Current in turn is carried between the current collectors of multiple stacks in a system, as well as being carried out of the hot environment to the power conditioning electronics and/or electrical load which operate in a much lower temperature environment, typically less than 150° C. In addition, a typical SOFC stack can generate a relatively high current, sometimes exceeding 100 amperes.

In the prior art, the electrical carriers typically are formed of metal alloys having very high melting points, such as Inconel, such that they are capable of maintaining structural integrity at any possible operating temperature of the fuel cell stack. A serious drawback of these alloys, however, is that they have relatively poor electrical conductivity, having resistivity values 100 or more times greater than those of copper or other metals having high conductivity. Thus, current carriers formed of high temperature alloys either suffer significant power loss or must be sized very large to minimize power loss. When sized as required to carry currents of which an SOFC is capable, such prior art high temperature alloy current carriers are then very expensive, heavy, difficult to fabricate, difficult to route in an SOFC system, and wastefully consumptive of space.

Conventional high-conductivity metals or alloys comprising, for example, copper, silver, and/or aluminum, are not practical either. At SOFC operating temperatures, copper is very soft such that it cannot support its own weight, which behavior is defined and used herein as being incompetent. Copper also corrodes very rapidly by oxidation at these temperatures, leading to disintegration. Aluminum is liquid. Silver is extremely soft or liquid and prohibitively expensive. In fact, there are no conventional highly-conductive materials suitable for extended service alone as a current carrier in an SOFC system at the expected temperatures of operation.

What is needed in the art is a current carrying material having high conductivity that is stable mechanically and chemically at SOFC operating temperatures.

It is a principal object of the present invention to reduce the size and cost of current carriers in an SOFC system.

SUMMARY OF THE INVENTION

Briefly described, a current carrier in accordance with the invention comprises at least a two-component structure wherein a high-conductivity current-carrying core is formed of metallic material which may be incompetent under the operating temperatures of an SOFC, such as copper, brass, bronze, silver, silver-copper alloys, molybdenum, tungsten, or the like. A protective jacket surrounds the core material and preferably is metallurgically bonded to the core. The jacket is preferably formed of a high temperature alloy that is highly resistant to chemical attack, such as stainless steel, nickel, or a nickel alloy, and forms a stable, conductive oxide surface layer; the jacket, in turn, protects the core from oxidation or corrosion. The cladding jacket is structurally competent to maintain the form of the electrical carrier in use, even at elevated temperatures at which the core material is mechanically incompetent although still highly conductive. Most of the current is carried by the core material so that a current carrier may be sized comparable to conventional copper cables.

To pass radially into and out of an electrical carrier formed in accordance with the invention, the current must pass through the cladding jacket which, although thin, has some resistivity. This problem is overcome by providing a clamp system having a large surface contact area and a contact paste consisting of fine silver particles mixed in an organic binder. At SOFC operating temperatures, the organic binder is destroyed, and the silver particles become very soft and form a diffusion bond between the clamp and the jacket of the current carrier, resulting in an excellent electrical connection with very low loss.

BRIEF DESCRIPTION OF THE DRAWINGS

The present invention will now be described, by way of example, with reference to the accompanying drawings, in which.

Corresponding reference characters indicate corresponding parts throughout the several views. The exemplification set out herein illustrates one preferred embodiment of the invention, in one form, and such exemplification is not to be construed as limiting the scope of the invention in any manner.

DESCRIPTION OF THE PREFERRED EMBODIMENTS

Figure 1:
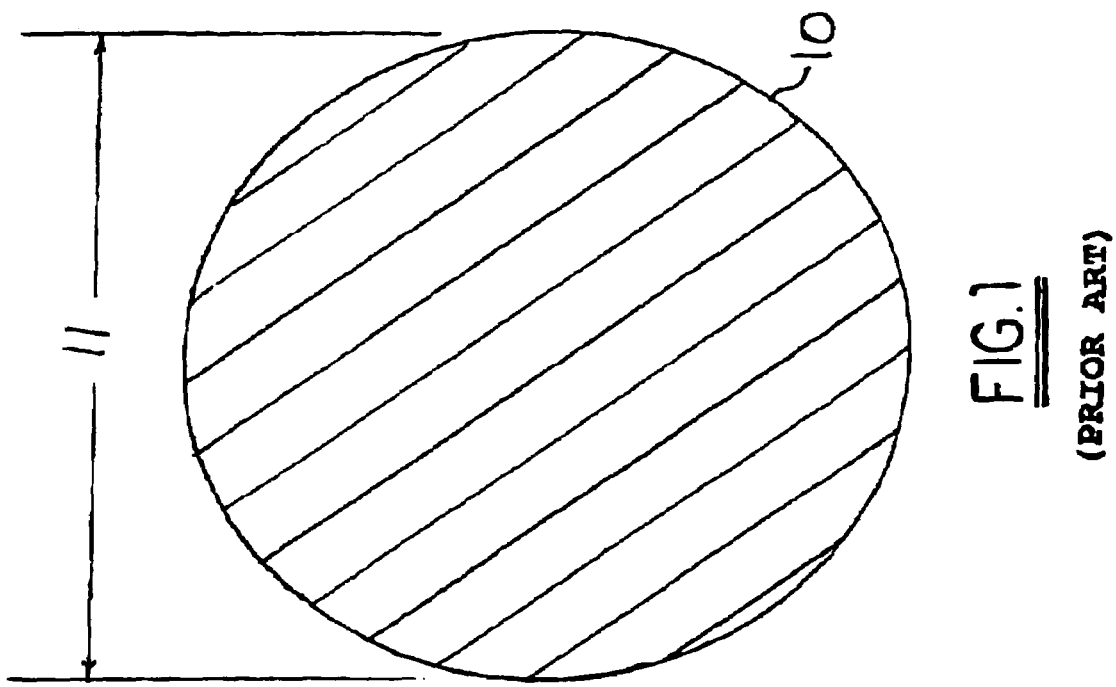
FIG. 1 is a cross-sectional view of a prior art monolithic electrical carrier.

Referring to FIG. 1, a prior art SOFC current carrier 10 is shown in cross-section having a relative diameter 11 defined for discussion purposes herein as 100 units. Carrier 10 is a monolith formed uniformly and entirely of a high-melting point alloy, such as Inconel alloy, having relatively high electrical resistivity as is well known in the art.

Figure 2:
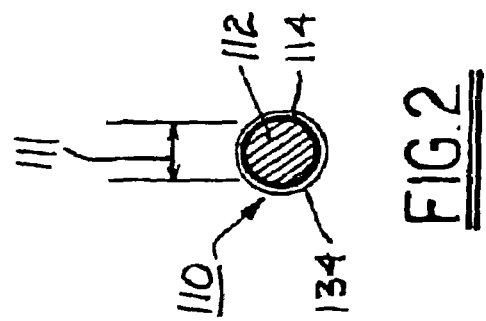
FIG. 2 is a cross-sectional view of an electrical carrier in accordance with the present invention, shown to scale with respect to the prior art carrier shown in FIG. 1.
Figure 3:
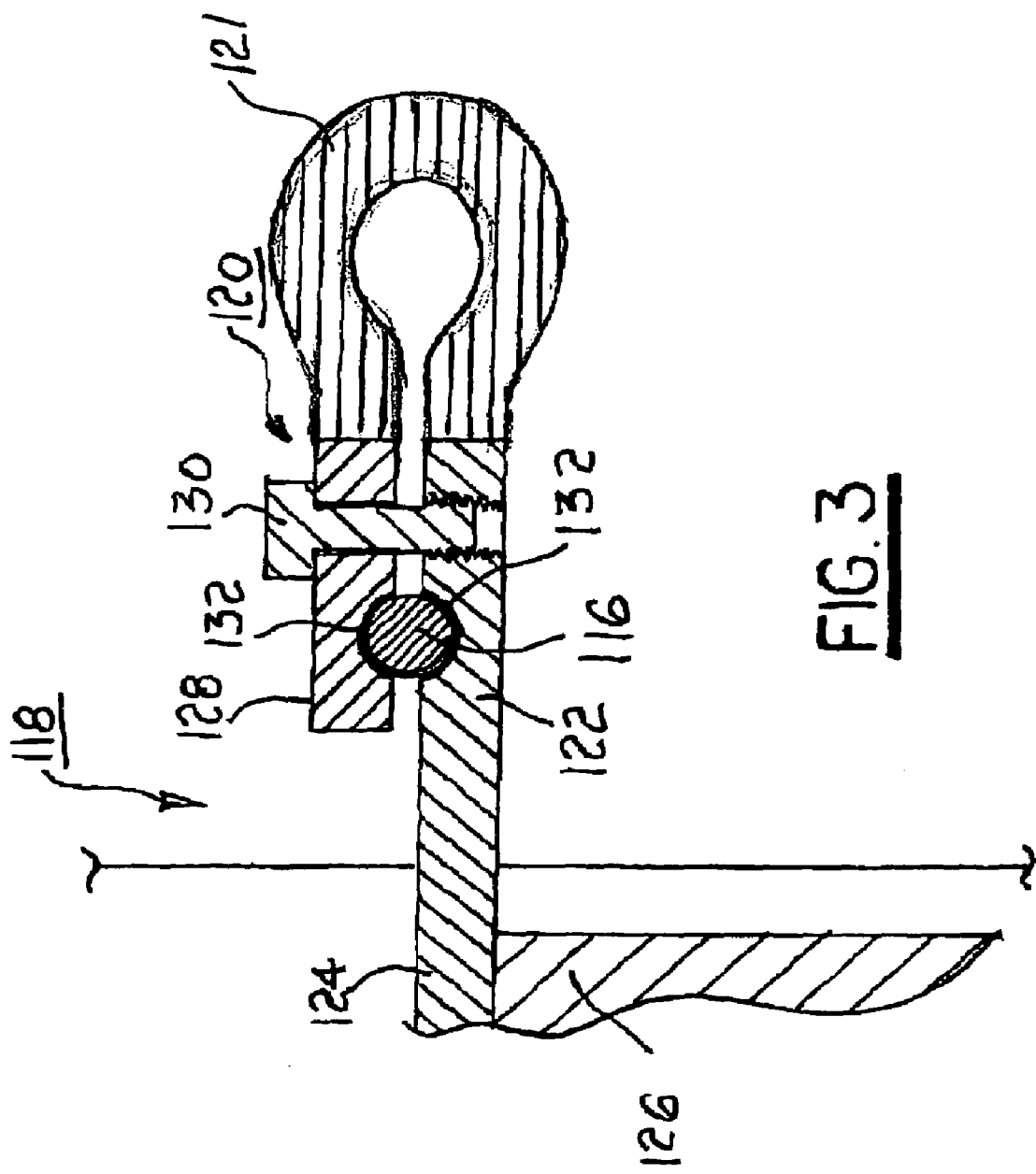
FIG. 3 is a cross-sectional view of an SOFC fuel cell system including an electrical carrier and terminal clamp in accordance with the invention.

Referring to FIGS. 2 and 3, a current carrier 110 in accordance with the invention comprises at least a two-component structure wherein a current-carrying core 112 is formed of a metallic material such as copper, brass, bronze, silver, silver-copper alloys, molybdenum, tungsten, lead, tin, bismuth, antimony, or the like having high electrical conductivity. Such materials may be mechanically incompetent at operating temperatures of an SOFC. A protective jacket 114 hermetically surrounds core material 112 and preferably is metallurgically bonded to the core in a process known in the art as "cladding".

In a typical cladding process, ductile metals are joined by rolling and thermal treatment to produce a metallurgical bond as the lattice structures of the metals are forced into conformance with each other. High pressure causes a sharing of electrons at the interface which produces a bond at the atomic level. No intermediate layers such as adhesives or braze metal are involved. However, other metallurgical bonding processes, such as brazing or welding, could be used to join the jacket to the core.

Jacket 114 protects the core material from oxidation and is preferably formed of a high temperature alloy that is highly resistant to chemical attack, for example, stainless steel (ferritic or austenitic), nickel, a nickel alloy, or the like, and in use forms a stable, conductive oxide surface layer. Jacket 114 preferably is structurally competent to maintain the form of an electrical carrier 116 in use in an SOFC system 118, even at elevated temperatures at which core material 112 may be mechanically incompetent although still highly conductive. Most of the current is carried by the core material so that a current carrier may be sized comparable to conventional copper cables. In FIG. 2, the relative diameter 111 of core material 112 is 10 units. Because the unit resistance of the core material of improved current carrier 110 is about 100 times less than the unit resistance of prior art current carrier 10, the cross-sectional area of improved current carrier 110 may be reduced to about 1/100 that of the prior art carrier.

In a presently preferred embodiment, improved current carrier 110 comprises a copper core 112 and a stainless steel clad jacket 114.

Referring to FIG. 3, an exemplary clamp system 120 having a large surface contact area between the clamping surface and a current carrier comprises a first clamping element 122 preferably integral with a current interconnect 124 of an SOFC stack 126, and a second adjustable clamping element 128. Preferably, first clamping element 122 is integrated with and flexibly connected to second element 128 via hinge element 121. The length of the clamp is one to ten times the diameter of the current carrier. Clamping force is exerted via one or more bolts 130. In a currently preferred embodiment, a contact paste 132 consisting of fine silver or silver alloy particles mixed in an organic binder is disposed in the joint between carrier 116 and clamping elements 122,128. At SOFC operating temperatures, the organic binder is destroyed, and the silver or silver alloy particles become very soft and form a diffusion bond between clamp elements 122, 128 and jacket 114, resulting in an electrical connection with very low loss.

It will be obvious that the clamping system just described is but exemplary, and that all mechanical clamping systems affording large area of contact between the clamping element and the carrier are fully comprehended by the invention.

An electrically insulative layer 134 can be applied to the outer surface of improved current carrier 110 in regions between the clamping elements to prevent electrical shorting to other metallic components in the hot zone. Layer 134 can be a ceramic coating applied, for example, by plasma spray, or by slurry coat and bake, or by any other suitable coating process. Layer 134 may also comprise a ceramic sleeve slid onto rod stock of carrier 110 either before or after forming into SOFC carrier 116.

Current carrier 110 may be formed in any convenient cross-sectional shape in addition to round, for example, flattened oval similar to a strip or bar (not shown), or substantially rectangular with rounded corners (not shown).

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A system for conducting electricity in a solid oxide fuel cell system between a stack interconnect and a load, comprising:
    a) current carrier including a core formed of a first metallic material and a jacket surrounding said core formed of a second metallic material, wherein said core material is of greater electrical conductivity than said jacket material, and wherein said core is metallurgically bonded to said jacket at a surface interface between said core and said jacket; and
    b) a clamp system for connecting said current carrier to said stack interconnect or to said load, including a conductive paste disposed between said current carrier and at least one clamp element for improving electrical conductivity therebetween.

2. A system in accordance with claim 1 wherein said clamp system includes first and second clamp elements for making contact with said current carrier.

3. A system in accordance with claim 1 wherein said metallurgical bond includes a sharing of electrons at said surface interface between said core and said jacket to produce said metallurgical bond at the atomic level.

4. A system in accordance with claim 1 wherein said core is metallurgically bonded to said jacket along the entire surface interface between said core and said jacket.

5. A solid oxide fuel cell system comprising:
    a current carrier including a core formed of a first metallic material and a jacket surrounding said core formed of a second metallic material, wherein said core material is of greater electrical conductivity than said jacket material, and wherein said core is metallurgically bonded to said jacket at a surface interface between said core and said jacket;
    a current interconnect; and
    a clamp system for connecting said current carrier to said current collector or to said load, said clamp system including a conductive paste disposed between said current carrier and at least one clamp element for improving electrical conductivity therebetween.

6. A solid oxide system in accordance with claim 5 wherein said conductive paste includes silver particles.

7. A solid oxide system in accordance with claim 5 wherein said conductive paste includes silver alloy particles.

* * * * *